(12) United States Patent
Shiota et al.

(10) Patent No.: US 11,086,185 B2
(45) Date of Patent: Aug. 10, 2021

(54) LIGHT BEAM DIRECTION CONTROL ELEMENT, DISPLAY DEVICE, AND MANUFACTURING METHOD FOR LIGHT BEAM DIRECTION CONTROL ELEMENT

(71) Applicant: TIANMA JAPAN, LTD., Kanagawa (JP)

(72) Inventors: Kunihiro Shiota, Kawasaki (JP); Ken Sumiyoshi, Kawasaki (JP); Takumi Usukura, Kawasaki (JP)

(73) Assignee: TIANMA JAPAN, LTD., Kanagawa (JP)

( * ) Notice: Subject to any disclaimer, the term of this patent is extended or adjusted under 35 U.S.C. 154(b) by 154 days.

(21) Appl. No.: 16/150,388

(22) Filed: Oct. 3, 2018

(65) Prior Publication Data
US 2019/0100853 A1   Apr. 4, 2019

(30) Foreign Application Priority Data

Oct. 4, 2017   (JP) .............................. JP2017-194506
Jun. 13, 2018   (JP) .............................. JP2018-113134

(51) Int. Cl.
*C25D 13/12* (2006.01)
*G02B 5/00* (2006.01)
(Continued)

(52) U.S. Cl.
CPC ........... *G02F 1/1681* (2019.01); *C25D 13/12* (2013.01); *G02B 5/003* (2013.01); *G02B 27/142* (2013.01);
(Continued)

(58) Field of Classification Search
CPC . G02F 1/1681; G02F 1/167; G02B 2207/123; G02B 27/142; G02B 5/003; C25D 13/12
See application file for complete search history.

(56) References Cited

U.S. PATENT DOCUMENTS 7,751,667 B2    7/2010  Daniel et al.
2017/0010516 A1*  1/2017  Shiota ............... G02F 1/133602
(Continued)

FOREIGN PATENT DOCUMENTS

| CN | 107621722 A | * | 1/2018 | .......... G02F 1/1323 |
| WO | 2015/122083 A1 | | 8/2015 | |
| WO | WO2015/141740 | * | 9/2015 | ......... G02F 1/13306 |

*Primary Examiner* — George G King
(74) *Attorney, Agent, or Firm* — Sughrue Mion, PLLC

(57) ABSTRACT

A light beam direction control element includes: a first transparent substrate; a second transparent substrate facing the first transparent substrate; a first conductive film pattern having openings and being formed on a surface of the first transparent substrate opposing the second transparent substrate; a second conductive film pattern having openings and being formed on a surface of the second transparent substrate opposing the first transparent substrate; an electrophoretic element being sandwiched between the first and second conductive film patterns, and including light-shielding electrophoretic particles having a surface charge and a transparent dispersion medium; and light-transmissive regions being disposed between the first and second transparent substrates, being sandwiched between at least a portion of the openings of the first and second conductive film patterns, having a surface parallel to the first and second conductive film patterns, and having side walls surrounded by the electrophoretic element.

2 Claims, 16 Drawing Sheets

(51) Int. Cl.
*G02B 27/14* (2006.01)
*G02F 1/167* (2019.01)
*G02F 1/1681* (2019.01)

(52) U.S. Cl.
CPC ........ *G02F 1/167* (2013.01); *G02B 2207/123* (2013.01)

(56) References Cited

U.S. PATENT DOCUMENTS

2017/0097554 A1* 4/2017 Shiota ................. G02F 1/13306
2019/0094576 A1* 3/2019 Wang ................... G02F 1/1323

* cited by examiner

LIGHT BEAM DIRECTION CONTROL ELEMENT, DISPLAY DEVICE, AND MANUFACTURING METHOD FOR LIGHT BEAM DIRECTION CONTROL ELEMENT

CROSS-REFERENCE TO RELATED APPLICATIONS

This Non-provisional application claims priority under 35 U.S.C. § 119(a) on Patent Application No. 2017-194506 filed in Japan on Oct. 4, 2017 and Patent Application No. 2018-113134 filed in Japan on Jun. 13, 2018, the entire contents of which are hereby incorporated by reference.

BACKGROUND

The present disclosure relates to a light beam direction control element, a display device, and a manufacturing method for a light beam direction control element.

Flat panel display devices are used as display devices of various information processing devices such as mobile phones, PDAs (personal digital assistants), ATMs (automatic teller machines, and personal computers, and in recent years, flat panel display devices with a wide viewing angle are being put into practical use.

An example of such a flat panel display device is a liquid crystal display device, for example. A generally known configuration for a liquid crystal display device is one in which the liquid crystal display device has installed therein an optical element that adjusts the output direction of light entering from the rear, a backlight that emits uniform light towards the optical elements, and a liquid crystal display that displays images.

Also, as liquid crystal display devices have increased in size and are used in more applications, various light orientation characteristics are required.

In particular, there are needs such as to restrict the viewing angle to prevent others from viewing the screen in order to prevent divulging of information, and preventing emission of light in unneeded directions. As an optical element that can meet such needs, an optical film that can restrict the viewing angle (or light output range) of a display has been proposed and put into practical use.

However, in a liquid crystal display device with such an optical film, there is a need to remove the optical film every time the display is to be viewed from multiple directions simultaneously. This would require the user to engage in a complex and time-consuming process, and thus, there is increased demand to be able to easily switch between a wide viewing angle and a narrow viewing angle without requiring the user to remove the optical film.

Thus, a light beam direction control element that can switch the display between a wide viewing angle mode and a narrow viewing angle mode according to need is proposed. Examples of such a technique pertaining to a light beam direction control element include the specification of U.S. Pat. No. 7,751,667 (Patent Document 1) and WO 2015/122083 (Patent Document 2).

FIG. 16 is a cross-sectional view of a light beam direction control element disclosed in Patent Document 1. A light beam direction control element 611 disclosed in Patent Document 1 has a transparent substrate 621, a transparent conductive film 631 disposed on a main surface 621a of the transparent substrate 621, a plurality of transparent pillars 640 that are formed so as to be separated from each other on the main surface 631a of the transparent conductive film 631, and a mixed body 660 that is a mixture of a transparent solvent and a light-absorption element disposed between the transparent pillars 640. Also, in the light beam direction control element 611 disclosed in Patent Document 1, a transparent cover 622 having a main surface 622a on which the transparent conductive film 632 is provided, is disposed on top surfaces 640a of the transparent pillars 640.

FIG. 17 is a cross-sectional view of a light beam direction control element disclosed in Patent Document 2. A light beam direction control element 711 disclosed in Patent Document 2 has a first transparent substrate 721, a plurality of conductive light-shielding film patterns 731 that are disposed so as to be separated from each other on a main surface 721a of the first transparent substrate, an electrophoretic element 760 disposed on a main surface 731a of each conductive light-shielding film pattern 731, and light-transmissive regions 740 that are formed on the main surface 721a of the first transparent substrate and between the electrophoretic elements 760. Also, in the light beam direction control element 711 disclosed in Patent Document 2, a second transparent substrate 722 having a main surface 722a on which the transparent conductive film 732 is provided, is disposed on top surfaces 740a of the light-transmissive regions 740.

However, the light beam passing through the light beam direction control element 161 disclosed in Patent Document 1 is reflected at the interface between the transparent substrate 621 and the transparent conductive film 631, at the interface between the transparent conductive film 631 and the transparent pillars 640, at the interface between the transparent pillars 640 and the transparent conductive film 632, and at the interface between the transparent conductive film 632 and the transparent cover 622, which reduces transmittance.

Similarly, the light beam passing through the light beam direction control element 711 disclosed in Patent Document 2 is reflected at the interface between the light-transmissive regions 740 and the transparent conductive film 732, and at the interface between the transparent conductive film 732 and the second transparent substrate 722, which reduces transmittance.

SUMMARY

An aspect of the present disclosure adopts the following constitutions to solve the above problems. A light beam direction control element includes: a first transparent substrate; a second transparent substrate disposed so as to face the first transparent substrate; a first conductive film pattern that has openings and that is formed on a first surface of the first transparent substrate opposing the second transparent substrate; a second conductive film pattern that has openings and that is formed on a second surface of the second transparent substrate opposing the first transparent substrate; an electrophoretic element that is sandwiched between the first conductive film pattern and the second conductive film pattern, and that includes light-shielding electrophoretic particles that have a surface charge and a transparent dispersion medium; and a plurality of light-transmissive regions that are disposed between the first transparent substrate and the second transparent substrate, that are sandwiched between at least a portion of the openings of the first conductive film pattern and at least a portion of the openings of the second conductive film pattern, that have a surface parallel to the first conductive film pattern and the second conductive film pattern, and that have side walls surrounded by the electrophoretic element.

It is to be understood that both the foregoing general description and the following detailed description are exemplary and explanatory and are not restrictive of this disclosure.

BRIEF DESCRIPTIONS OF DRAWINGS

The present disclosure can be appreciated by the description which follows in conjunction with the following figures, wherein.

DETAILED DESCRIPTION OF EMBODIMENTS

Figure 1:
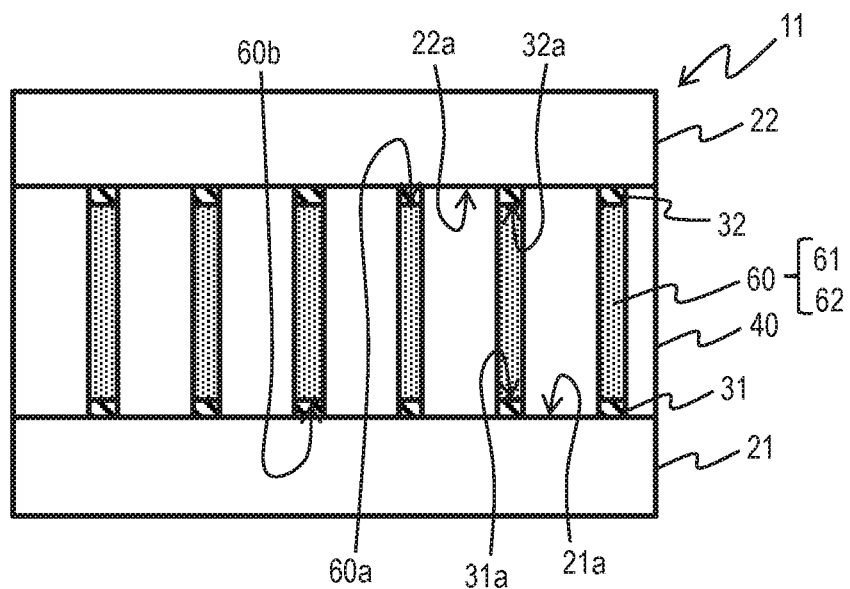
FIG. 1 is a cross-sectional view illustrating an example of a light beam direction control element in narrow viewing angle mode (narrow viewing angle state) according to Embodiment 1.

Embodiments will be explained below with reference to attached drawings. The embodiments are merely examples for realizing the present disclosure, and it should be noted that the embodiments do not limit the technical scope of the present disclosure. The same reference characters are assigned to common components in the respective drawings. The shapes depicted in the drawings do not necessarily correspond to the actual dimensions and ratios.

Embodiment 1

Figure 2:
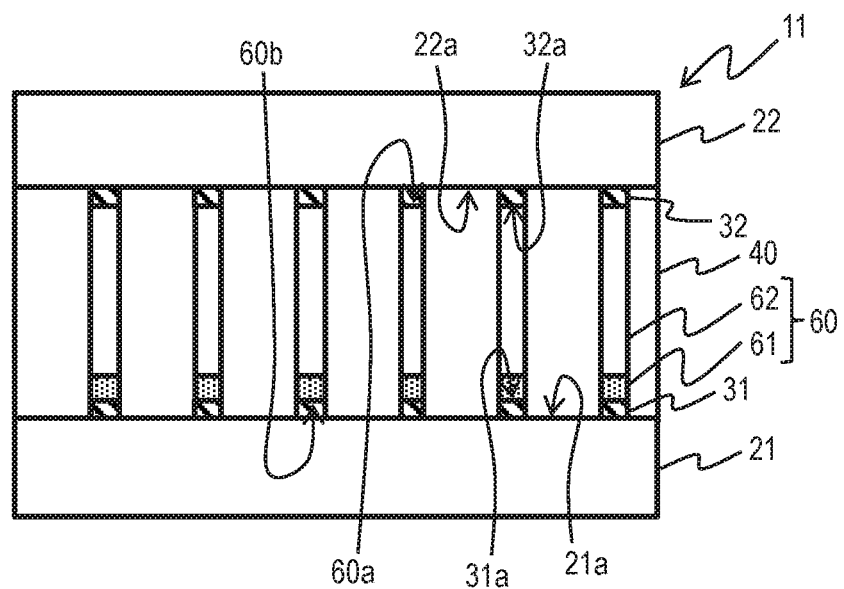
FIG. 2 is a cross-sectional view illustrating an example of the light beam direction control element in wide viewing angle mode (wide viewing angle state) according to Embodiment 1.

FIG. 1 is a cross-sectional view illustrating an example of a light beam direction control element in narrow viewing angle mode (narrow viewing angle state). FIG. 2 illustrates an example of a light beam direction control element in wide viewing angle mode (wide viewing angle state).

A light beam direction control element 11 includes a first transparent substrate 21, a transparent conductive film pattern 31, light-transmissive regions 40, an electrophoretic element 60, a second transparent substrate 22, and a transparent conductive film pattern 32. The transparent conductive film pattern 31 is formed on a surface 21a (main surface) of the first transparent substrate 21. The transparent conductive film pattern 32 is formed on a surface 22a (main surface) of the second transparent substrate 22. The first transparent substrate 21 and the second transparent substrate 22 are arranged such that a main surface 31a of the transparent conductive film pattern 31 and a main surface 32a of the transparent conductive film pattern 32 oppose each other.

The electrophoretic element 60 is disposed so as to be sandwiched between the main surface 31a of the transparent conductive film pattern 31 and the main surface 32a of the transparent conductive film pattern 32. The electrophoretic element 60 includes electrophoretic particles 61 and a dispersion medium 62. In the example of FIGS. 1 and 2, the entire top surface 60a of the electrophoretic element 60 is in contact with the transparent conductive film pattern 32, and the entire bottom surface 60b of the electrophoretic element 60 is in contact with the transparent conductive film pattern 31.

The cross-sections of the light-transmissive regions 40 and the dispersion medium 62 are depicted without a hatching pattern for ease of viewing. The light-transmissive regions 40 are included in the gap between the first transparent substrate 21, the transparent conductive film pattern 31, the second transparent substrate 22, and the transparent conductive film pattern 32.

The narrow viewing angle mode illustrated in FIG. 1 is realized by dispersing the electrophoretic particles 61 in the electrophoretic element 60 throughout the dispersion medium 62 disposed in the gap between each light-transmissive region 40. Thus, the widening of the light beam passing from bottom to top in the drawing is restricted by the electrophoretic element 60 between the first transparent substrate 21 and the second transparent substrate 22. As a result, comparison of the light beam prior to and after passing through indicates that the viewing angle is narrowed, and the narrow viewing angle mode is set. By contrast, the wide viewing angle mode illustrated in FIG. 2 is realized by concentrating the electrophoretic particles 61 near the transparent conductive film pattern 31. The electrophoretic particles 61 are gathered close to the transparent conductive film pattern 31 by setting the potential of the transparent conductive film pattern 31 relative to the transparent conductive film pattern 32 at the opposite polarity to the surface charge of the electrophoretic particles 61. Thus, the widening of the light beam passing from bottom to top in the drawing is mostly unrestricted by the electrophoretic particles 61 between the first transparent substrate 21 and the second transparent substrate 22. As a result, comparison of the light beam prior to and after passing through indicates that the difference in viewing angle is mostly eliminated, and the wide viewing angle mode is set.

In other words, if the surface charge of the electrophoretic particles 61 is negative (−), then the transparent conductive film pattern 31 is set to be a positive pole. If the surface charge of the electrophoretic particles 61 is positive (+), then the transparent conductive film pattern 31 is set to be a negative pole.

Below, a case will be described of a configuration in which the surface charge of the electrophoretic particles 61 is negative (−). Even if the surface charge of the electrophoretic particles 61 is positive (+), a similar configuration can be achieved by setting the polarity of the transparent conductive film pattern 31 to the opposite polarity.

Figure 16:
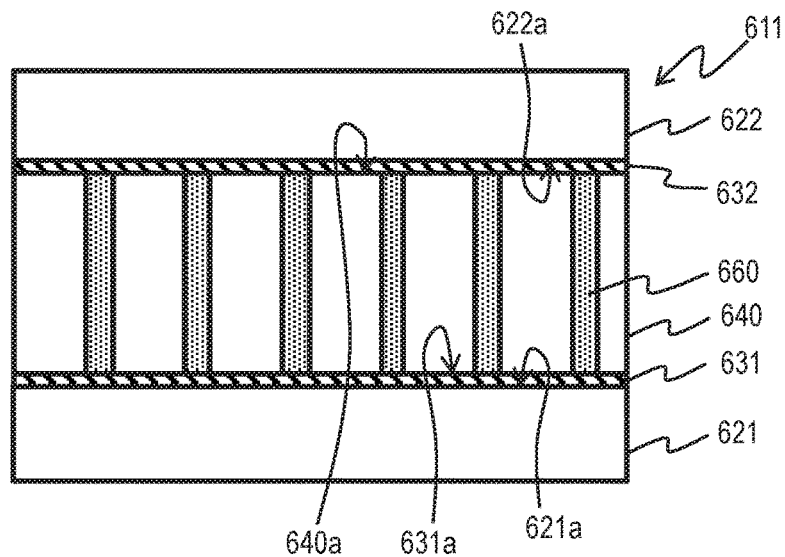
FIG. 16 is a cross-sectional view illustrating an example of a light beam direction control element according to a related art.

The transparent conductive films 631 in FIG. 16 are disposed so as to cover the main surface 621a of the transparent substrate 621, but in the example of FIG. 1, the transparent conductive film pattern 31 and the transparent conductive film pattern 32 are formed so as to have openings, and the light-transmissive regions 40 are disposed in the openings. Particularly in the example of FIG. 1, the light-transmissive regions 40 are not in contact with the main surface 31a of the transparent conductive film pattern 31 or the main surface 32a of the transparent conductive film pattern 32.

Thus, it is possible to increase the proportion of light beams, among the light beams entering the light-transmissive regions 40, that have not passed interfaces with a high reflectance (interface between the light-transmissive regions and the transparent conductive films, and interface between the transparent conductive films and the transparent substrate). As a result, it is possible to realize a high transmittance light beam direction control element 11.

Figure 3:
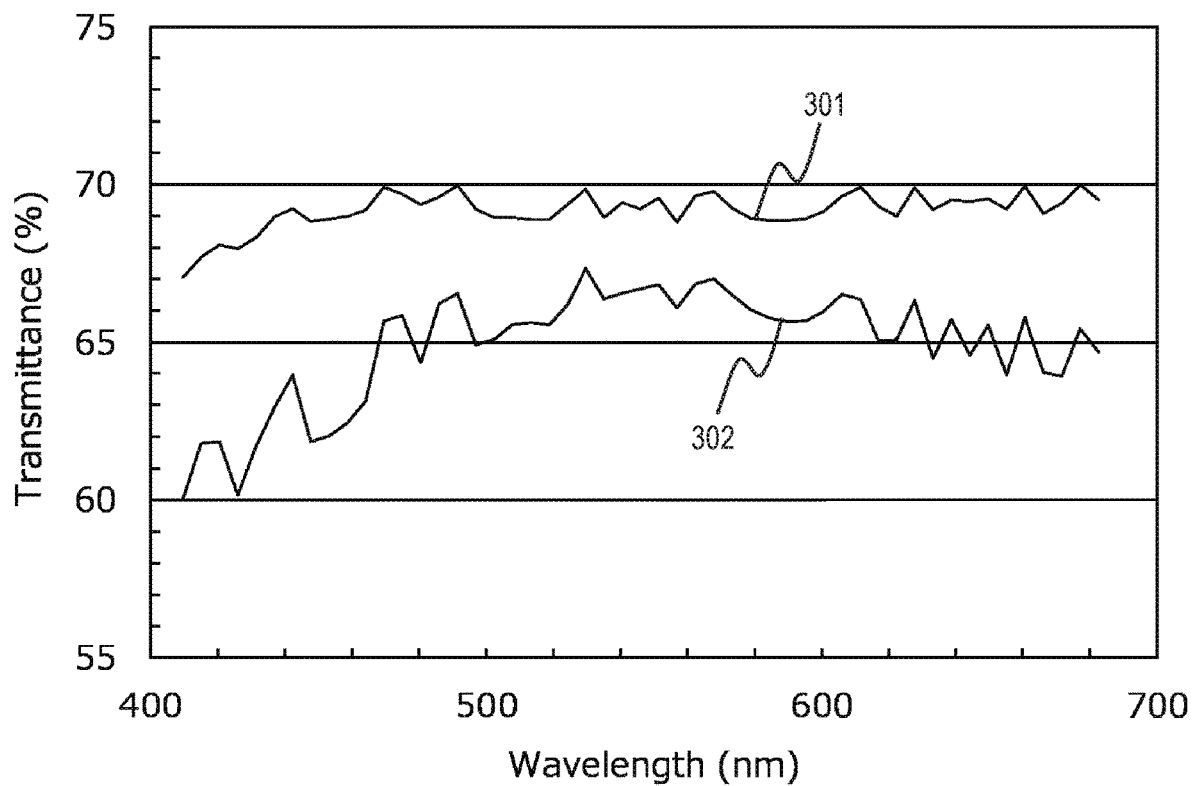
FIG. 3 is a graph illustrating simulation results for frontal transmittance for each wavelength in the light beam direction control element of Embodiment 1 and a light beam direction control element of a related art.
Figure 17:
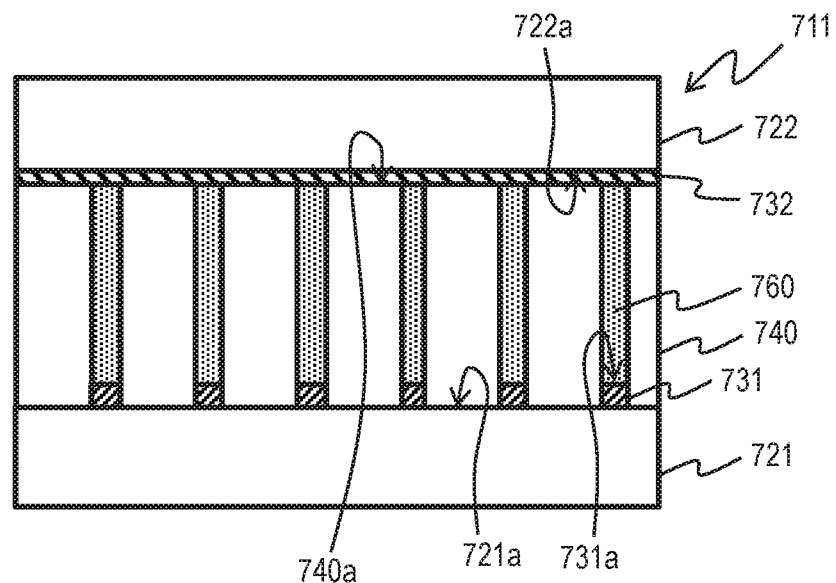
FIG. 17 is a cross-sectional view illustrating an example of a light beam direction control element according to a related art.

FIG. 3 is a graph illustrating simulation results for frontal transmittance for each wavelength in the light beam direction control element 11 of the present embodiment and the light beam direction control element 711 disclosed in Patent Document 2, which is a related art document. Here, "frontal" indicates a perspective from the direction normal to the surface of the substrate. FIG. 3 illustrates a transmittance 301 of the light beam direction control element 11 of the present embodiment and a transmittance 302 of the light beam direction control element 711 of FIG. 17. The simulation results of FIG. 3 indicate that in all wavelengths, the transmittance of the light beam direction control element 11 is 3 to 8% higher than that of the light beam direction control element 711.

Next, the configuration of the light beam direction control element 11 will be described in more detail with reference to FIG. 1. The first transparent substrate 21 is made of a glass substrate, polyethylene terephthalate (PET), polycarbonate (PC), polyethylene naphthalate (PEN), or a cyclo-olefin polymer (COP), for example. This similarly applies to the second transparent substrate 22.

A suitable thickness for the transparent conductive film pattern 31 is 10 nm to 1000 nm, and in the present embodiment, the thickness is 50 nm. ITO (indium tin oxide), ZnO, IGZO (indium gallium zinc oxide), or the like can be used to form the transparent conductive film pattern 31, and ITO is used in the present embodiment. This similarly applies to the transparent conductive film pattern 32.

In positions of the first transparent substrate 21 complementary to the transparent conductive film pattern 31, the light-transmissive regions 40 are formed. "Complementary positions" indicate a positional relationship in which the transparent conductive film pattern 31 and the light-transmissive regions 40 are alternately disposed on the main surface of the first transparent substrate 21, and it is preferable that the transparent conductive film pattern 31 and the light-transmissive regions 40 not overlap. This similarly applies to the positional relationship between the transparent conductive film pattern 32 on the second transparent substrate 22 and the light-transmissive regions 40.

A suitable height for the light-transmissive regions 40 is 3 μm to 300 μm, and in the present embodiment, the height is 60 μm. Also, a suitable width for the light-transmissive regions 40 (light transmission pattern width) is 1 μm to 150 μm, and in the present embodiment, the width is 20 μm. Furthermore, a suitable gap between the light-transmissive regions 40 is 0.25 μm to 40 μm, and in the present embodiment, the gap is 5 μm.

Between the light-transmissive regions 40, the electrophoretic element 60, which is a mixture of the electrophoretic particles 61 and the dispersion medium 62, is disposed, as described above.

Figure 4:
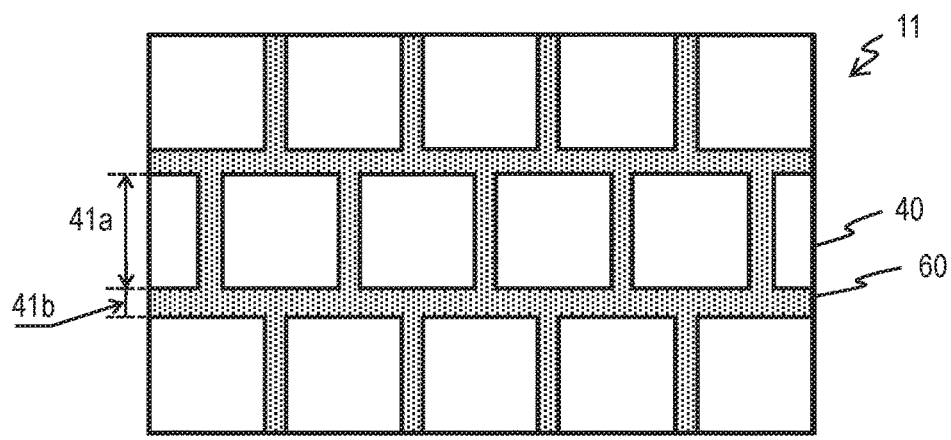
FIG. 4 is a plan view of an example of the light beam direction control element according to Embodiment 1.
Figure 5:
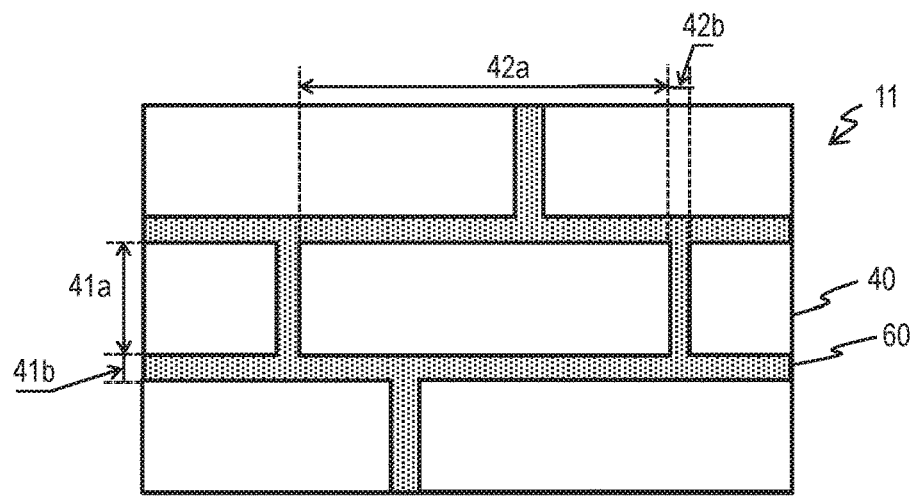
FIG. 5 is a plan view of an example of the light beam direction control element according to Embodiment 1.
Figure 6:
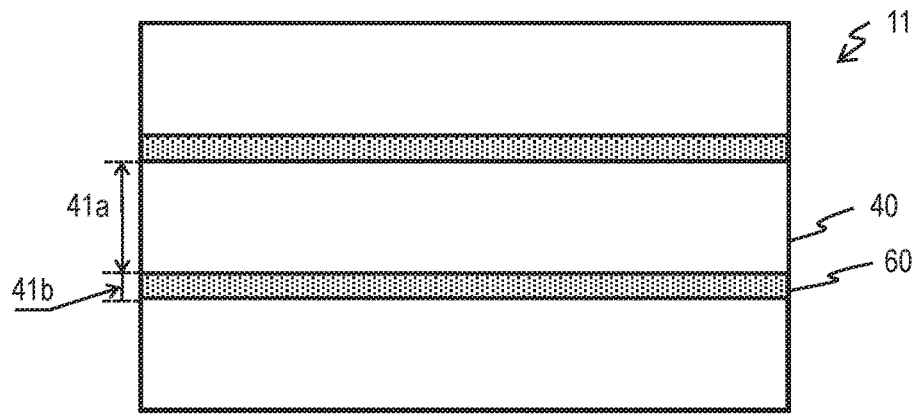
FIG. 6 is a plan view of an example of the light beam direction control element according to Embodiment 1.

Next, three examples of an arrangement of the light-transmissive regions 40 and the electrophoretic element 60 are described with reference to FIGS. 4 to 6. FIGS. 4 to 6 illustrate plan view examples of the light beam direction control element 11. In FIGS. 4 to 6, the transparent conductive film pattern 32 and the second transparent substrate 22 are not illustrated.

The example of FIG. 4 with a square pattern structure (first example) has a plan view form in which square light-transmissive regions 40 are arranged in a grid pattern, and the electrophoretic element 60 (transparent conductive film patterns 31 and 32) forms a square grid pattern that embeds the gaps between the plurality of light-transmissive regions 40. In other words, the light beam direction control element 11 in this case is formed such that a light transmission pattern width 41a and the light transmission pattern width 42a corresponding to the widths of the light-transmissive regions 40 are equal to each other, and is also formed such that a light-shielding film pattern width 41b and a light-shielding film pattern width 42b corresponding to the widths of the electrophoretic element 60 (gap between the light-transmissive regions 40) are equal to each other.

In the example of FIG. 5 with a rectangular pattern structure (second example), the plan view form of the light-transmissive regions 40 and the electrophoretic element 60 (transparent conductive film patterns 31 and 32) is that of a rectangular grid pattern. In other words, the light beam direction control element 11 in this case is formed such that the light transmission pattern width 42a is longer than the light transmission pattern width 41a. On the other hand, the light-shielding film pattern width 41b and the light-shielding film pattern width 42b are formed to be equal in length.

In the example of FIG. 6 with a stripe pattern structure (third example), the light-transmissive regions 40 and the electrophoretic elements 60 (transparent conductive film patterns 31 and 32) form stripes in a plan view. In other words, the light beam direction control element 11 in this case is formed such that the light transmission pattern width 41a of each light-transmissive region 40 and the light-shielding film pattern width 41b of the electrophoretic elements 60 are formed alternately and continuously. In the case of a stripe pattern, a plurality of the transparent conductive film patterns 31 and 32 are electrically connected at an external portion (not illustrated) and driven.

Figure 7A:
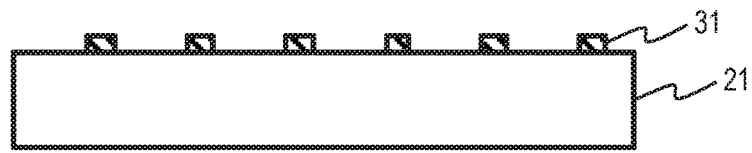
FIG. 7A is an explanatory diagram illustrating an example of a step (a transparent conductive film pattern formation step) of a manufacturing method for the light beam direction control element according to Embodiment 1.
Figure 7B:
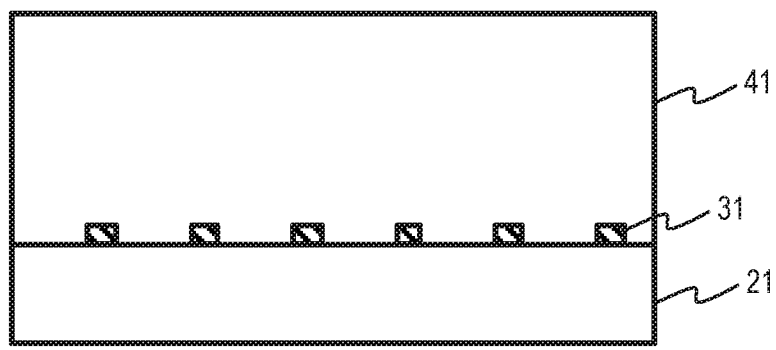
FIG. 7B is an explanatory diagram illustrating an example of a step (photosensitive resin layering step) of the manufacturing method for the light beam direction control element according to Embodiment 1.

Below, an example of steps of a manufacturing method for the light beam direction control element 11 of the present embodiment will be described with reference to FIGS. 7A to 7F. First, as illustrated in FIG. 7A, the transparent conductive film pattern 31 is formed on the surface (main surface) of the first transparent substrate 21 (transparent conductive film pattern formation step). Next, as illustrated in FIG. 7B, a transparent photosensitive resin layer 41 is layered as a negative photoresist film on the main surface side of the first transparent substrate 21 on which the transparent conductive film pattern 31 is formed (photosensitive resin layering step). The transparent photosensitive resin layer 41 is a member to become the light-transmissive regions 40 after the transmissive region formation step to be described later.

Figure 7C:
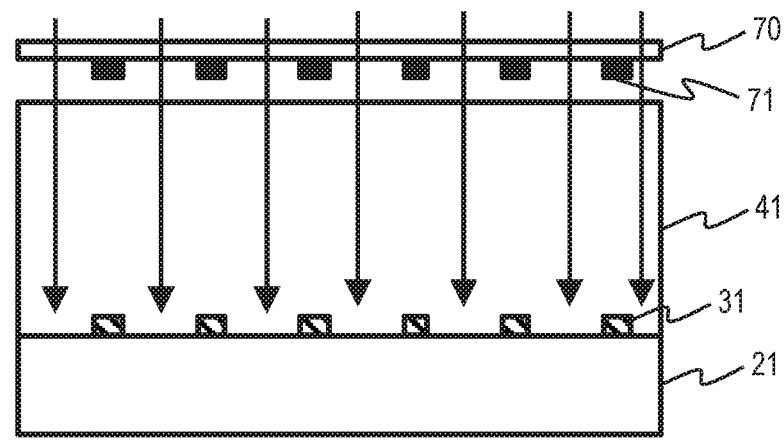
FIG. 7C is an explanatory diagram illustrating an example of steps (an exposure light radiation step and a position control step) of the manufacturing method for the light beam direction control element according to Embodiment 1.

Next, as illustrated in FIG. 7C, exposure light 75 is radiated onto the transparent photosensitive resin layer 41 through a photomask 70 including a mask pattern 71, thereby exposing the transparent photosensitive resin layer 41 (exposure light radiation step). When performing the exposure light radiation step, alignment marks (not illustrated) formed in the first transparent substrate 21 and the photomask 70 are used such that the position of the mask pattern 71 overlaps the transparent conductive film pattern 31 to perform control in which the positions of the photomask 70 and the first transparent substrate 21 are adjusted (position control step).

Figure 7D:
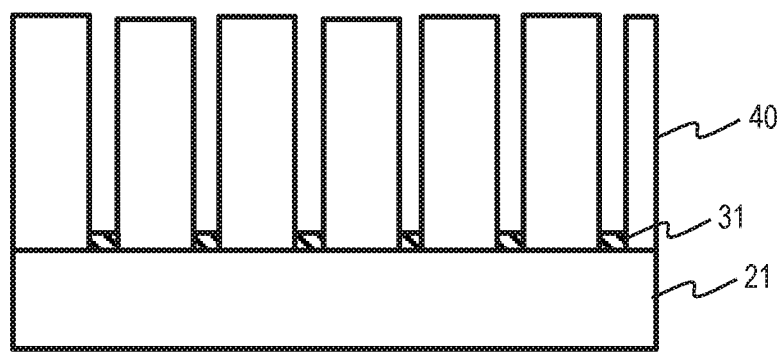
FIG. 7D is an explanatory diagram illustrating an example of a step (a transmissive region formation step) of the manufacturing method for the light beam direction control element according to Embodiment 1.

Next, by performing a developing process on the exposed transparent photosensitive resin layer 41, the plurality of light-transmissive regions 40 that are separated from each other as illustrated in FIG. 7D are formed (transmissive region formation step).

Figure 7E:
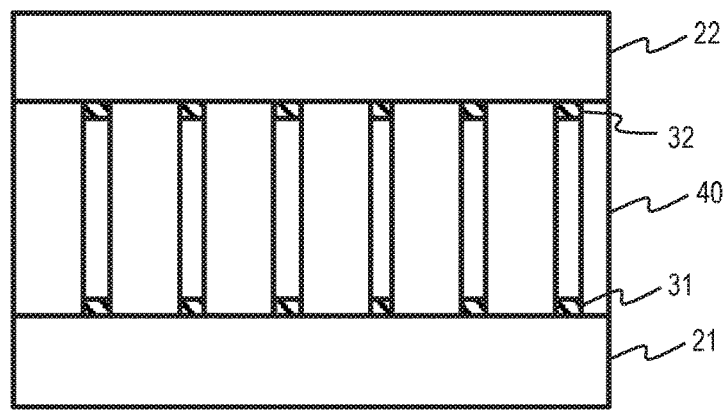
FIG. 7E is an explanatory diagram illustrating an example of a step (a transparent substrate placement step) of the manufacturing method for the light beam direction control element according to Embodiment 1.

Next, using alignment marks (not illustrated) formed on the second transparent substrate 22 and the first transparent substrate 21, the second transparent substrate 22 provided with the transparent conductive film pattern 32 is placed on the surfaces of the light-transmissive regions 40 as illustrated in FIG. 7E (transparent substrate placement step).

Figure 7F:
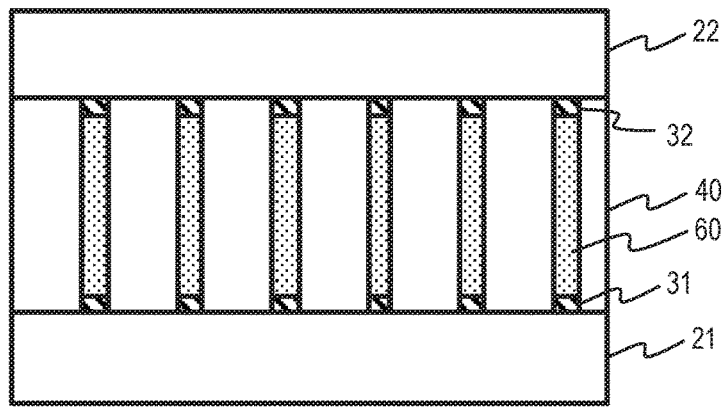
FIG. 7F is an explanatory diagram illustrating an example of a step (an electrophoretic element filling step) of the manufacturing method for the light beam direction control element according to Embodiment 1.

Then, as illustrated in FIG. 7F, the gaps formed between the transparent conductive film pattern 31, the light-transmissive regions 40, and the transparent conductive film pattern 32 are filled with the electrophoretic element 60 (electrophoretic element filling step).

In the description based on FIGS. 7A to 7F, a method was described in which the phoretic element filling step is performed after the transparent substrate placement step, but the light beam direction control element 11 could be manufactured in a similar manner even if the order of these two steps were reversed.

In other words, after performing steps similar to what was described with reference to FIGS. 7A to 7D, a process may be performed in which the phoretic element filling step in which the electrophoretic element 60 fills the gaps between the light-transmissive regions 40 is performed before the transparent substrate placement step, and then, the transparent substrate placement step is performed in which the second transparent substrate 22 including the transparent conductive film pattern 32 is placed on the surfaces of the light-transmissive regions 40 and the electrophoretic element 60.

Here, the exposure light 75 used for exposure is parallel light, that is parallel to the layering direction (direction in which the transparent photosensitive resin layer 41 and the like are layered). A UV light source is used as the light source for the exposure light 75, and in the exposure light radiation step of the present embodiment, UV light with a wavelength of 365 nm is radiated as the exposure light 75, for example.

A suitable amount of exposure during radiation is ranging from 100 mJ/cm$^2$ to 1000 mJ/cm$^2$, and in the present embodiment, the amount of exposure by the exposure light 75 is 200 mJ/cm$^2$.

As a method for forming the transparent photosensitive resin layer 41 in the exposure light radiation step, a film deposition method employing a slit die coater, a wire coater, an applicator, dry film transfer, spray coating, screen printing, or the like can be used, for example. By such a film deposition method, in the present embodiment, the transparent photosensitive resin layer 41, an appropriate thickness of which is 30 µm to 300 µm, is formed to a thickness of 60 µm.

Also, the chemically amplified photoresist (product name "SU-8") made by MicroChem can be used for the transparent photosensitive resin used in the transparent photosensitive resin layer 41, for example. Characteristics of the transparent photosensitive resin are as follows.

The first characteristic is that the resin is an epoxy (specifically, a glycidyl ether derivative of a bisphenol A novolac) negative resist in which, by radiating ultraviolet light thereon, a photoinitiator generates an acid, and with this proton acid as a catalyst, a curable monomer is polymerized. The second characteristic is that in the visible light region, the resin has a very high transparency.

The third characteristic is that the curable monomer contained in the transparent photosensitive resin has a lower molecular weight prior to curing, and thus, is highly soluble in a solvent such as cyclopentanone, propylene glycol methyl ether acetate (PGMEA), gamma-butyrolactone (GBL), or isobutyl ketone (MIBK); therefore, the resin can easily be formed as a thick film.

The fourth characteristic is that the resin has a very high degree of transparency in the near-ultraviolet wavelength range as well, and thus, even if the film is formed to be thick, it allows through ultraviolet light. The fifth characteristic is that, as a result of having the above-mentioned characteristics, the resin can be formed in a pattern with a high aspect ratio of 3 or greater. The sixth characteristic is that there are many functional groups of curable monomers, and thus, after curing, the monomer forms a very high density crosslink, which provides very high thermal and chemical stability. Thus, processing thereof after patterning is easy.

Although the aforementioned chemically amplified photoresist (product name "SU-8") was used as the transparent photosensitive resin layer 41, the transparent photosensitive resin layer is not limited thereto, and any photocurable material may be used as long as similar properties can be attained.

In the transmissive region formation step of FIG. 7D, after exposure, a developing process is performed on the transparent photosensitive resin layer 41. In other words, by developing the transparent photosensitive resin layer 41 and then performing thermal annealing (thermal annealing process) at 120 to 150° C. for 30 to 60 minutes, the transparent photosensitive resin layer 41 is divided into the plurality of light-transmissive regions 40. If the first transparent substrate 21 is a glass substrate, for example, then it is preferable that the above conditions be 150° C. and 30 minutes.

The space width (light-shielding film pattern width) between the light-transmissive regions 40 formed here is, as described above, 5 µm. Also, if the light-transmissive regions 40 are made of SU-8, the refractive index thereof is 1.5 to 1.6.

During the transparent substrate placement step of FIG. 7F, the second transparent substrate 22 including the transparent conductive film pattern 32 is disposed on the light-transmissive regions 40. The second transparent substrate 22 is fixed to the outer periphery of the first transparent substrate 21 through an adhesive (not illustrated). The adhesive used for fixing the substrate to each other may be thermosetting or UV-curable.

As described above, in the light beam direction control element 11 of the present embodiment, the transparent conductive film pattern 31 and the transparent conductive film pattern 32 are formed so as not to be continuous but to have openings, and the openings are in contact with the light-transmissive regions 40. Particularly in the example of FIG. 1, the light-transmissive regions 40 are only in contact with the openings, and not in contact with the main surface 31a of the transparent conductive film pattern 31 or the main surface 32a of the transparent conductive film pattern 32.

Thus, it is possible to increase the proportion of light beams, among the light beams entering the light-transmissive regions 40, that have not passed interfaces with a high reflectance (interface between the light-transmissive regions and the transparent conductive films, and interface between the transparent conductive films and the transparent substrate), and therefore, a high transmittance light beam direction control element 11 can be achieved.

Embodiment 2

Figure 8:
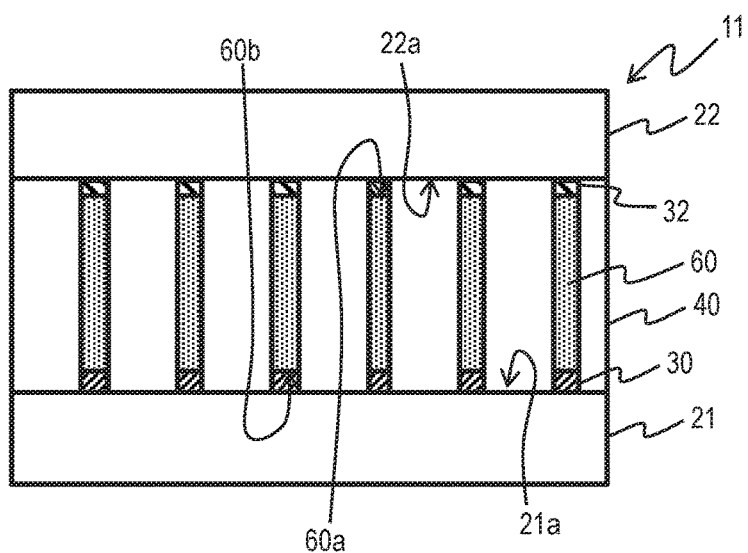
FIG. 8 is a cross-sectional view illustrating an example of a light beam direction control element in narrow viewing angle mode (narrow viewing angle state) according to Embodiment 2.

Below, a light beam direction control element 11 of the present embodiment will be described. Differences from Embodiment 1 will be described. FIG. 8 is a cross-sectional view illustrating an example of a light beam direction control element in narrow viewing angle mode (narrow viewing angle state). In the light beam direction control element 11 of Embodiment 2, the surface 21a (main surface) of the first transparent substrate 21 has formed thereon not the transparent conductive film pattern 31 but a conductive light-shielding film pattern 30.

A suitable material for the conductive light-shielding film pattern is a light-shielding conductive material such as aluminum, chromium, copper, or chromium oxide, and in the present embodiment, aluminum is used. A suitable thickness for the conductive light-shielding film pattern 30 is ranging from 10 nm to 1000 nm, and in the present embodiment, the thickness is 300 nm.

In the manufacturing method illustrated in FIGS. 7A to 7F, by using the conductive light-shielding film pattern 30 instead of the transparent conductive film pattern 31, it is possible to manufacturing the light beam direction control element 11 of the present embodiment. Below, another example of the manufacturing method for the light beam direction control element 11 of the present embodiment will be described.

Figure 9:
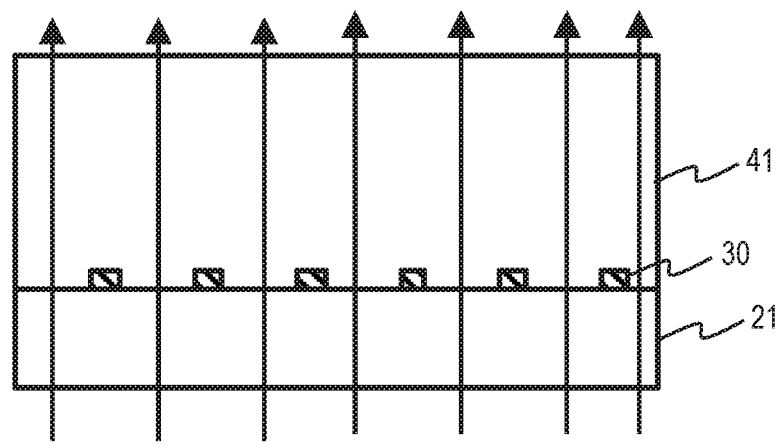
FIG. 9 is an explanatory diagram illustrating an example of a step (an illumination formation step) of a manufacturing method for the light beam direction control element according to Embodiment 2.

FIG. 9 is a descriptive drawing illustrating an example of an illumination formation step in the manufacturing process for the light beam direction control element 11. In the manufacturing process for the light beam direction control element 11 of the present embodiment, the illumination formation step illustrated in FIG. 9 may be employed instead of the exposure light radiation step and the transmissive region formation step of the manufacturing process of Embodiment 1. In the exposure light radiation step, the exposure light 75 is radiated from the rear surface side of the first transparent substrate 21 with the conductive light-shielding film pattern 30 as a photomask, thereby patterning the transparent photosensitive resin layer 41 (illumination formation step).

Parallel light is used as the exposure light 75 used for exposure, and a UV light source is used as the light source. In the present embodiment, UV light with a wavelength of 365 nm is used as the exposure light 75. Regarding the amount of exposure, for which a range of 100 mJ/cm$^2$ to 1000 mJ/cm$^2$ is suitable, 200 mJ/cm$^2$ was set in this case as well.

In this manner, by using the conductive light-shielding film pattern 30 as a photomask, in addition to the effects attained in Embodiment 1, it is possible to attain a configuration whereby the relative positions of the light-transmissive regions 40 and the conductive light-shielding film pattern 30 are naturally complementary, even without performing the position control step of Embodiment 1 for adjusting the positions of the photomask 70 and the first transparent substrate 21. Furthermore, it is possible to manufacture the light beam direction control element 11 such that the top surface 60a of the electrophoretic element 60 is in contact with the transparent conductive film pattern 32, which is an electrode, and the entire bottom surface 60b of the electrophoretic element 60 is in contact with the conductive light-shielding film pattern 30, which is an electrode, without performing the position control step.

Embodiment 3

Figure 10:
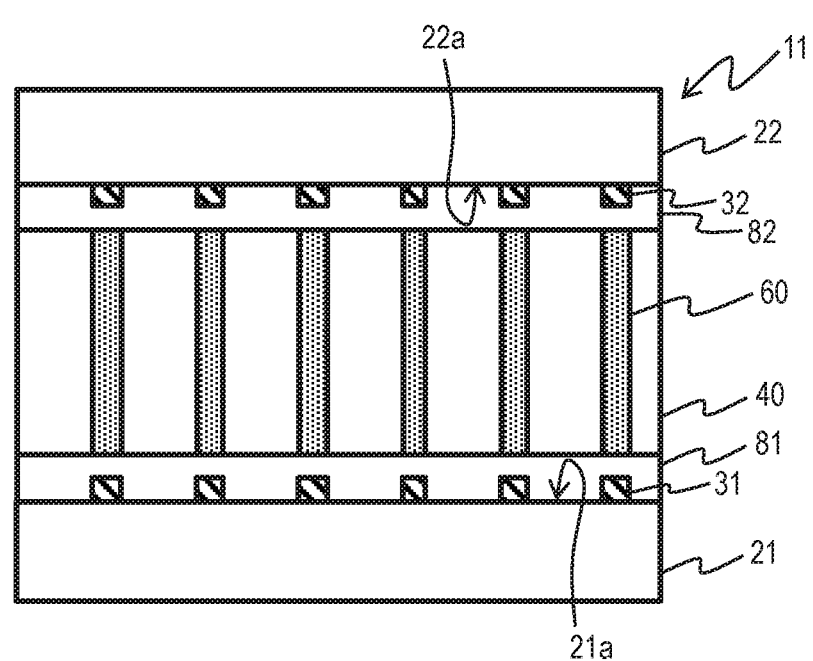
FIG. 10 is a cross-sectional view illustrating an example of a light beam direction control element in narrow viewing angle mode (narrow viewing angle state) according to Embodiment 3.
Figure 11:
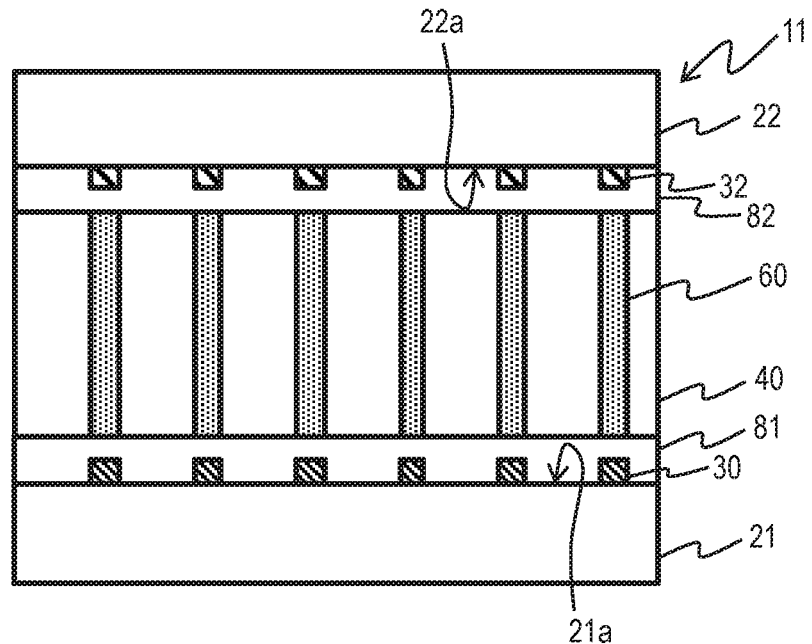
FIG. 11 is a cross-sectional view illustrating an example of a light beam direction control element in narrow viewing angle mode (narrow viewing angle state) according to Embodiment 3.

Below, a light beam direction control element 11 of the present embodiment will be described. Differences from Embodiment 1 will be described. FIGS. 10 and 11 are cross-sectional views illustrating an example of the light beam direction control element 11 in narrow viewing angle mode (narrow viewing angle state).

The light beam direction control element 11 of FIG. 10 further includes an insulating film 81 and an insulating film 82. The insulating film 81 is formed in a layer on the surface 21a (main surface) of the first transparent substrate 21 so as to cover the transparent conductive film pattern 31. The insulating film 82 is formed in a layer on the surface 22a (main surface) of the second transparent substrate 22 so as to cover the transparent conductive film pattern 32. The light-transmissive regions 40 and the electrophoretic element 60 are interposed between the insulating film 81 and the insulating film 82. Examples of a material to form the insulating film 81 and the insulating film 82 include silicon oxide, silicon nitride, or the like.

In the light beam direction control element 11 of FIG. 11, the conductive light-shielding film pattern 30 is formed instead of the transparent conductive film pattern 31 in FIG. 10. Details of the conductive light-shielding film pattern 30 are as described in Embodiment 2.

Figure 12A:
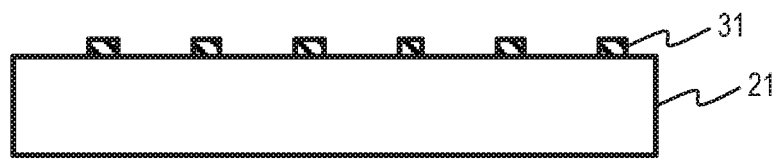
FIG. 12A is an explanatory diagram illustrating an example of a step (a transparent conductive film pattern formation step) of a manufacturing method for the light beam direction control element according to Embodiment 3.
Figure 12B:
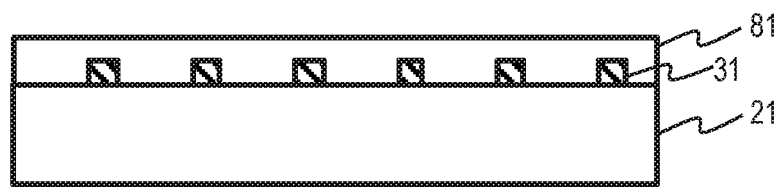
FIG. 12B is an explanatory diagram illustrating an example of a step (an insulating film layering step) of the manufacturing method for the light beam direction control element according to Embodiment 3.

An example of a manufacturing method for the light beam direction control element of FIG. 10 will be described with reference to FIGS. 12A to 12G. The transparent conductive film pattern formation step of FIG. 12A is similar to the transparent conductive film pattern formation step of FIG. 7A, and thus, descriptions thereof are omitted. In FIG. 12B, the insulating film 81 is formed on the first transparent substrate 21 on which the transparent conductive film pattern 31 is formed by a method such as CVD (chemical vapor deposition) so as to cover the transparent conductive film pattern 31 (insulating film layering step).

Figure 12C:
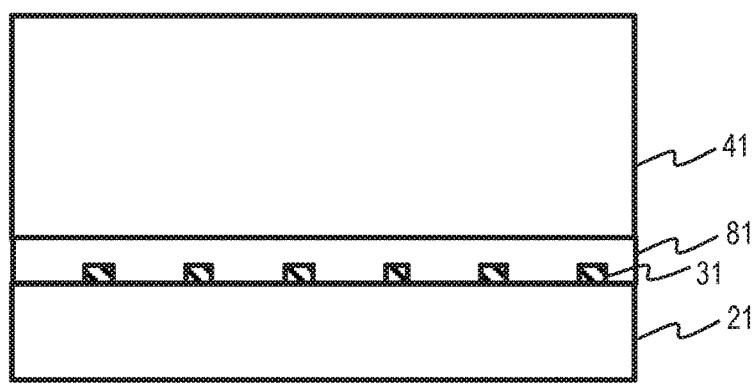
FIG. 12C is an explanatory diagram illustrating an example of a step (a photosensitive resin layering step) of the manufacturing method for the light beam direction control element according to Embodiment 3.

Next, as illustrated in FIG. 12C, in a manner similar to FIG. 7B, a transparent photosensitive resin layer 41 is layered as a negative photoresist film on the main surface side of the first transparent substrate 21 on which the transparent conductive film pattern 31 and the insulating film 81 are formed (photosensitive resin layering step).

Figure 12D:
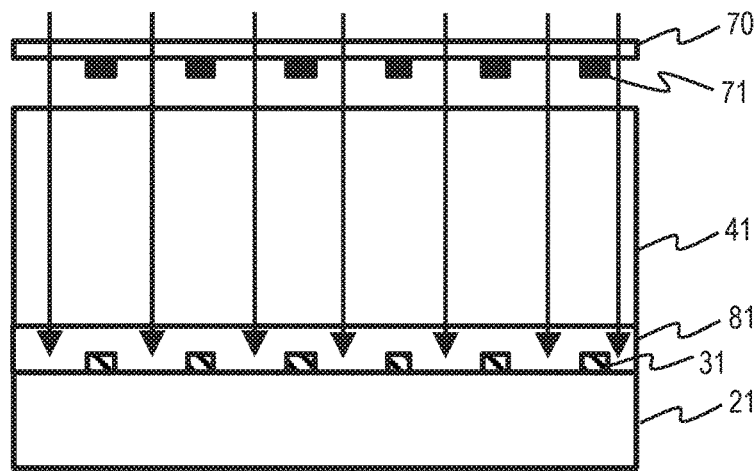
FIG. 12D is an explanatory diagram illustrating an example of steps (an exposure light radiation step and position control step) of the manufacturing method for the light beam direction control element according to Embodiment 3.

Next, as illustrated in FIG. 12D, in a manner similar to FIG. 7C, exposure light 75 is radiated onto the transparent photosensitive resin layer 41 through a photomask 70 including a mask pattern 71, thereby exposing the transparent photosensitive resin layer 41 (exposure light radiation step). When performing the exposure light radiation step, the positions of the photomask 70 and the first transparent substrate 21 are adjusted such that the position of the mask pattern 71 overlaps the transparent conductive film pattern 31 (position control step).

Figure 12E:
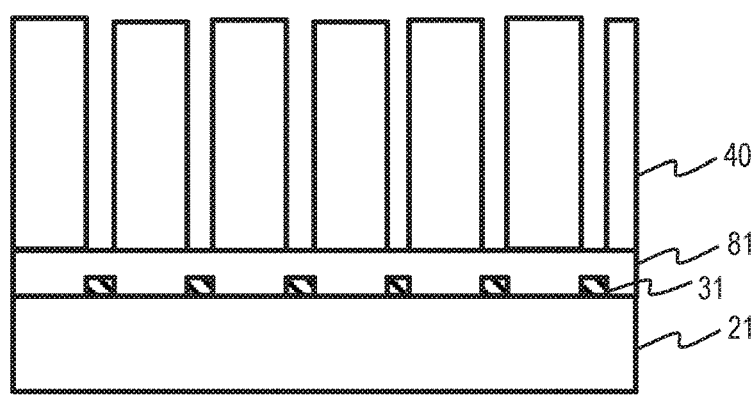
FIG. 12E is an explanatory diagram illustrating an example of a step (a transmissive region formation step) of the manufacturing method for the light beam direction control element according to Embodiment 3.

Next, as illustrated in FIG. 12E, in a manner similar to FIG. 7D, by performing a developing process on the exposed transparent photosensitive resin layer 41, the plurality of light-transmissive regions 40 that are separated from each other as illustrated in FIG. 7D are formed (transmissive region formation step).

Figure 12F:
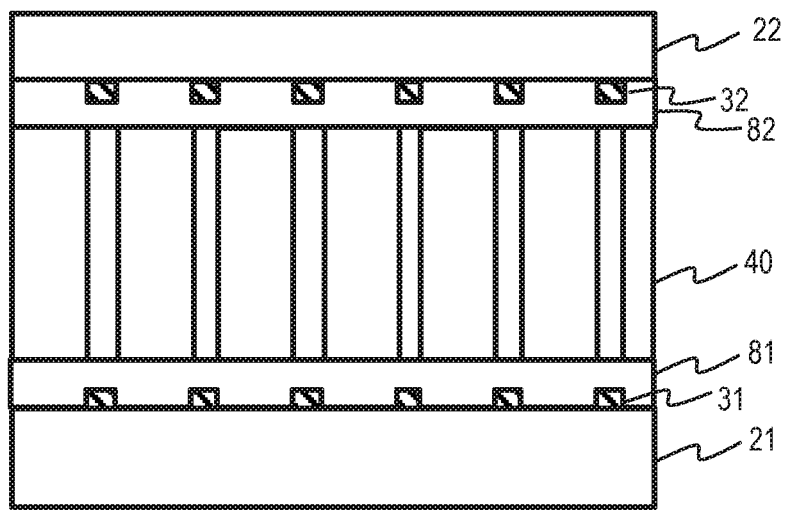
FIG. 12F is an explanatory diagram illustrating an example of a step (a transparent substrate placement step) of the manufacturing method for the light beam direction control element according to Embodiment 3.
Figure 12G:
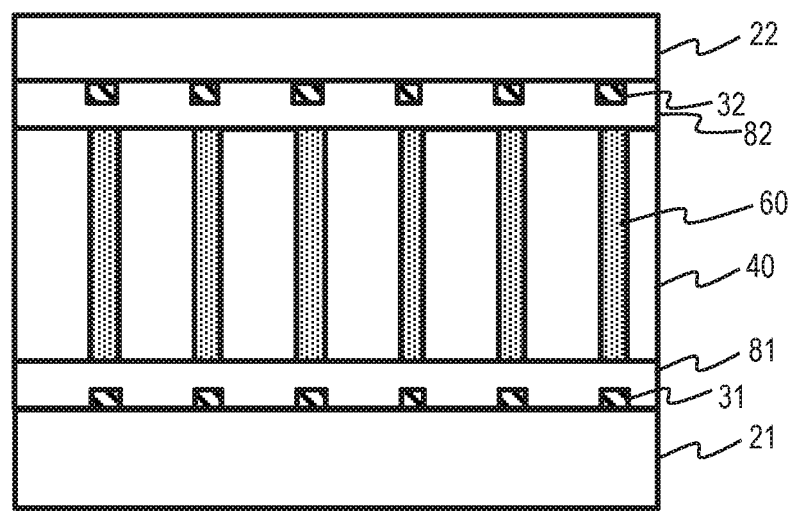
FIG. 12G is an explanatory diagram illustrating an example of a step (an electrophoretic element filling step) of the manufacturing method for the light beam direction control element according to Embodiment 3.

Next, as illustrated in FIG. 12F, the second transparent substrate 22 including the transparent conductive film pattern 32 and the insulating film 82 is disposed on the surfaces of the light-transmissive regions 40 (transparent substrate placement step). Then, as illustrated in FIG. 12G, the gaps formed between the transparent conductive film pattern 31, the light-transmissive regions 40, and the transparent conductive film pattern 32 are filled with the electrophoretic element 60 (phoretic element filling step).

The manufacturing method for the light beam direction control element 11 of FIG. 11 is similar to the manufacturing method for the light beam direction control element 11 of FIG. 10, but the illumination formation step (rear surface exposure) described with reference to FIG. 8 in Embodiment 2 may be employed instead of the exposure light radiation step and the transmissive region formation step.

In the light beam direction control element 11 of the present embodiment, as a result of insulating films being disposed on the surfaces of the transparent conductive films (or conductive light-shielding film pattern), which are electrodes, insulation between the electrodes is improved. Also, it is possible to mitigate adhesion of the electrophoretic particles 61 onto the surfaces of the electrodes. Thus, it is possible to mitigate deterioration of the electrophoretic element 60 resulting from adhesion of the electrophoretic particles 61 onto the surfaces of the electrodes. Also, it is possible to apply a stronger electric field and improve responsiveness.

Embodiment 4

Figure 13:
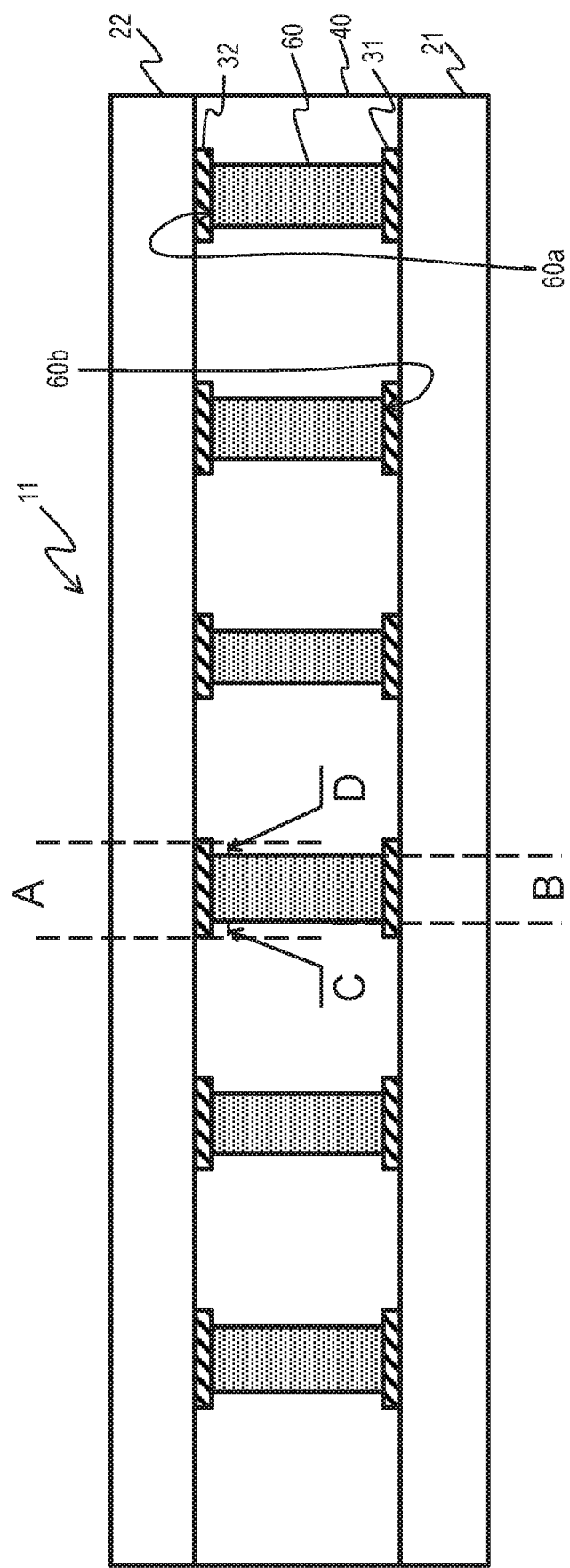
FIG. 13 is a cross-sectional view illustrating an example of a light beam direction control element in narrow viewing angle mode (narrow viewing angle state) according to Embodiment 4.

Below, a light beam direction control element 11 of the present embodiment will be described. Differences from Embodiment 1 will be described. FIG. 13 is a cross-sectional view illustrating an example of a light beam direction control element 11 in narrow viewing angle mode (narrow viewing angle state). In the light beam direction control element 11 of FIG. 13, a pattern width A of the transparent conductive film pattern 31 and the transparent conductive film pattern 32 is greater than a width B of the electrophoretic element 60.

Specifically, in the present embodiment in which the width of the light-transmissive regions 40 is 20 μm and the width B of the electrophoretic element 60 between the light-transmissive regions 40 is 5 μm, the pattern width A of the transparent conductive film pattern 31 and the transparent conductive film pattern 32 is greater than 5 μm and less than 25 μm, and 6 μm is a suitable width therefor, for example. Also, projection widths C and D of the transparent conductive film pattern 31 and the transparent conductive film pattern 32 from the electrophoretic element 60 are both greater than 0 μm and less than 20 μm, and 1 μm is a suitable width therefor, for example.

The manufacturing method for the light beam direction control element 11 of FIG. 13 is similar to the manufacturing method of Embodiment 1, for example. In the light beam direction control element 11 of FIG. 13, as a result of the pattern width A being greater than the width B of the electrophoretic element 60, it is possible to manufacture the light beam direction control element 11 such that the top surface 60a of the electrophoretic element 60 is in contact with the transparent conductive film pattern 32, which is an electrode, and the entire bottom surface 60b of the electrophoretic element 60 is in contact with the transparent conductive film pattern 31, which is an electrode, even if some positional offset were to occur in the position control step.

Figure 14:
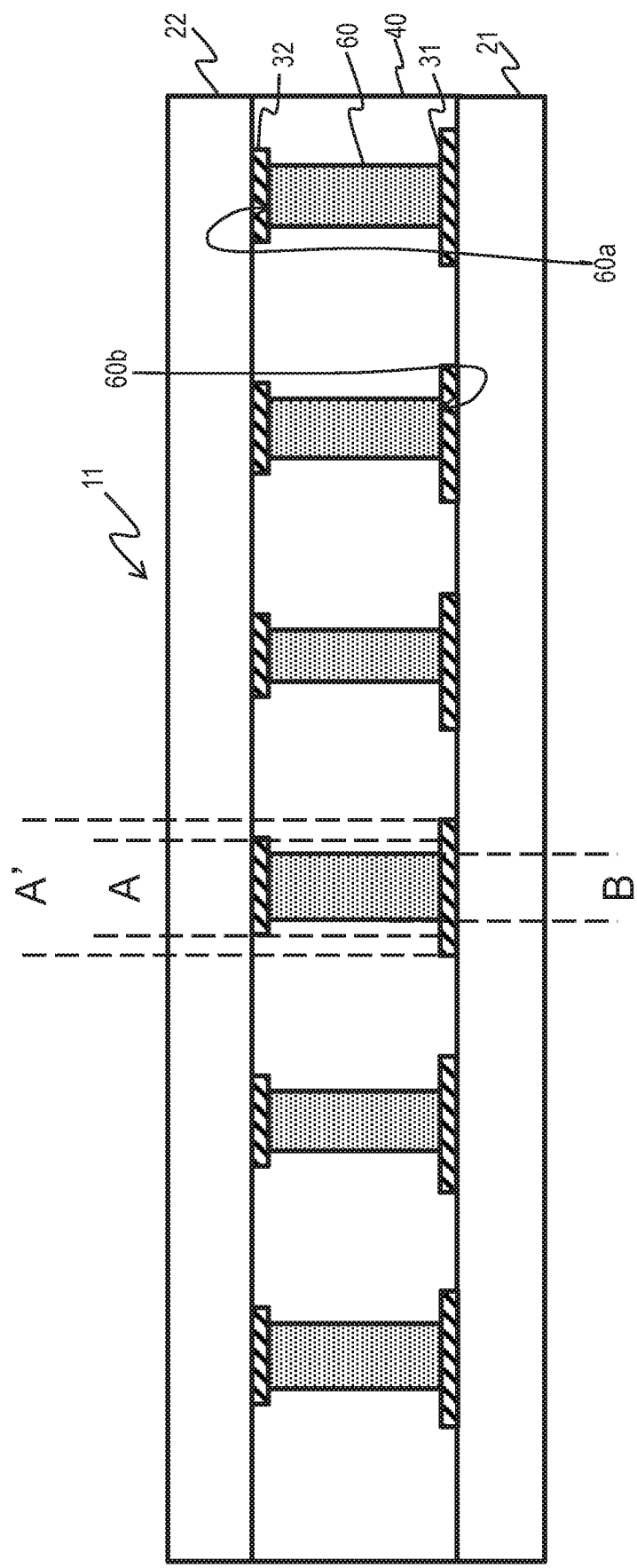
FIG. 14 is a cross-sectional view illustrating an example of a light beam direction control element in narrow viewing angle mode (narrow viewing angle state) according to Embodiment 4.

FIG. 14 is a cross-sectional view illustrating an example of a light beam direction control element 11 in narrow viewing angle mode (narrow viewing angle state). The light beam direction control element 11 of FIG. 14 differs from the light beam direction control element 11 of FIG. 19 in that a width A' of the transparent conductive film pattern 31 is greater than the pattern width A of the transparent conductive film pattern 32.

Specifically, if the pattern width A of the transparent conductive film pattern 32 is 5 μm, for example, then 6 μm to 10 μm would be suitable for the pattern width A' of the transparent conductive film pattern 31. The manufacturing method for the light beam direction control element 11 of FIG. 14 is similar to the manufacturing method of Embodiment 1, for example.

In the light beam direction control element 11 of FIG. 14, as a result of the fact that the pattern width A' of the transparent conductive film pattern 31 is greater than the pattern width A of the transparent conductive film pattern 32, it is possible to allow for some positional offset in not only the position control step but also the transparent substrate placement step. Thus, it is possible to manufacture the light beam direction control element 11 such that the top surface 60a of the electrophoretic element 60 is in contact with the transparent conductive film pattern 32, which is an electrode, and the entire bottom surface 60b of the electrophoretic element 60 is in contact with the transparent conductive film pattern 31, which is an electrode, even if some positional offset were to occur in the transparent substrate placement step.

Embodiment 5

Figure 15:
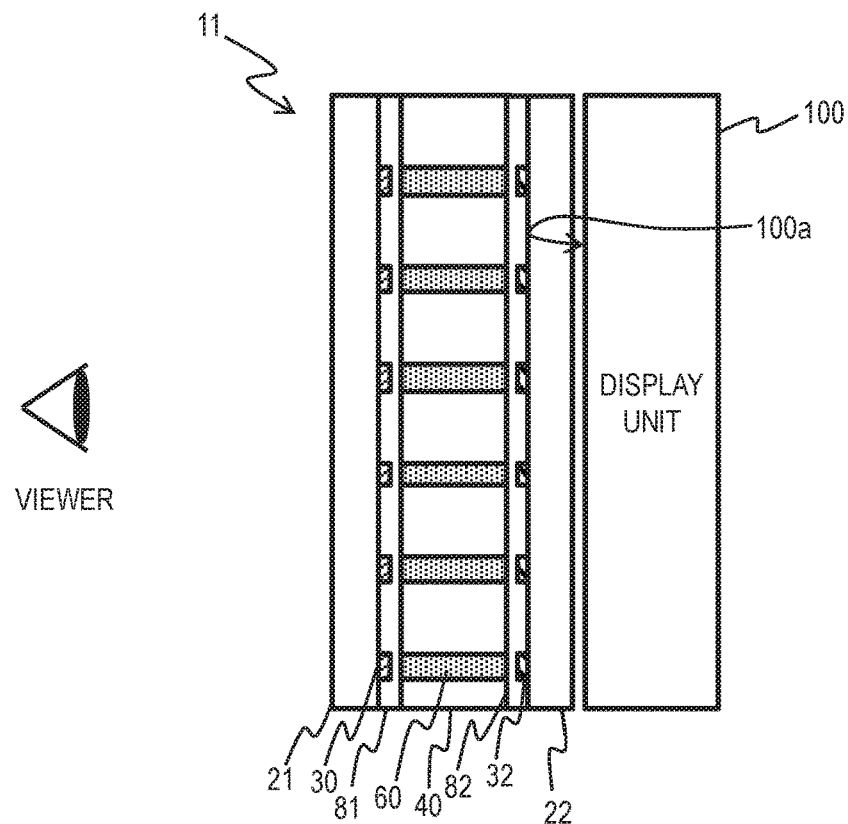
FIG. 15 is an explanatory diagram illustrating an example of a display device including a light beam direction control element according to Embodiment 5.

Below, in the present embodiment, an example of a display device including a light beam direction control element 11 will be described with reference to FIG. 15. The display device includes the light beam direction control element 11 and a display unit 100 that displays images, which are bonded together by a transparent adhesive layer, for example. In the example of FIG. 15, the light beam direction control element 11 is disposed on the surface 100a (display surface) side of the display unit 100. In other words, the surface opposite the main surface of the second transparent substrate 22 is bonded to the display unit 100. The light beam direction control element 11 in the example illustrated in FIG. 15 is the light beam direction control element 11 of FIG. 11 in which the conductive light-shielding film pattern 30 is formed on the first transparent substrate 21 (may alternatively be the light beam direction control element 11 of FIG. 8, for example).

In the example of FIG. 15, the light beam direction control element 11 is disposed such that the conductive light-shielding film pattern 30 is on the viewer side, or in other words, such that the transparent conductive film pattern 32 is closer to the surface 100a of the display unit 100. By arranging the light beam direction control element 11 in this manner, even if an optical moiré pattern were to occur as a result of an offset in the relative positions of the transparent conductive film pattern 32 and the light-transmissive regions 40, the optical moiré would not be visible by the viewer, and an excellent display state can be maintained.

Embodiment 6

Figure 18:
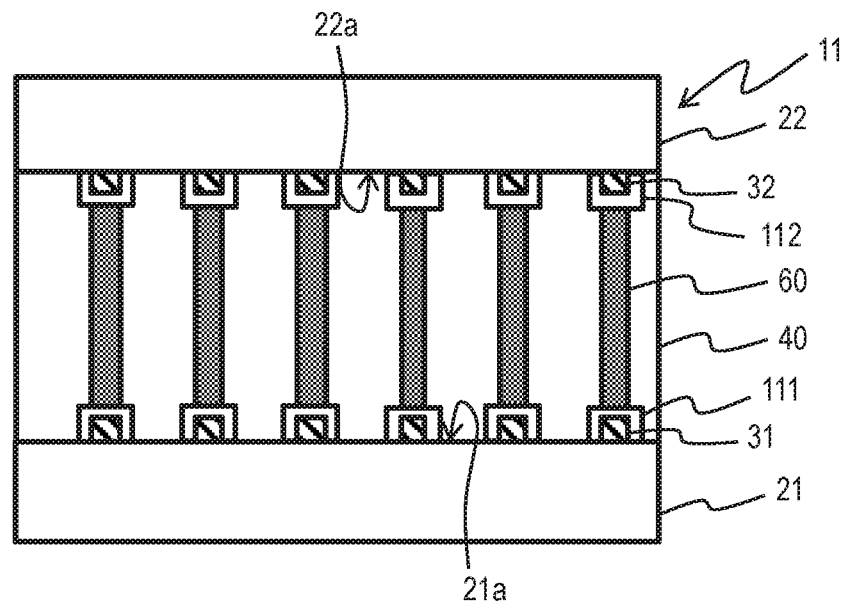
FIG. 18 is a cross-sectional view illustrating an example of a light beam direction control element in narrow viewing angle mode (narrow viewing angle state) according to Embodiment 6.
Figure 19:
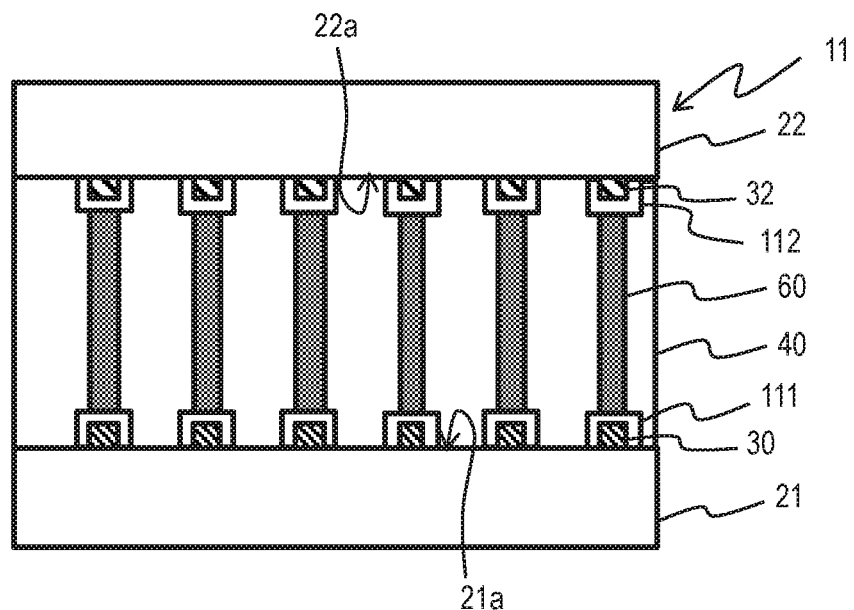
FIG. 19 is a cross-sectional view illustrating an example of a light beam direction control element in narrow viewing angle mode (narrow viewing angle state) according to Embodiment 6.

Below, a light beam direction control element 11 of the present embodiment will be described. Differences from Embodiment 3 will be described. FIGS. 18 and 19 are cross-sectional views illustrating an example of the light beam direction control element 11 in narrow viewing angle mode (narrow viewing angle state).

The light beam direction control element 11 of FIG. 18 includes an insulating film pattern 111 and an insulating film pattern 112. The insulating film pattern 111 is formed in a pattern on a surface 21a (main surface) of the first transparent substrate 21. The elements (excluding the openings) of the insulating film pattern 111 cover the elements (excluding the openings) of the transparent conductive film pattern 31. Also, the insulating film pattern 112 is formed in a pattern on a surface 22a (main surface) of the second transparent substrate 22. The elements (excluding the openings) of the insulating film pattern 112 cover the elements of the transparent conductive film pattern 32. Elements of the insulating film pattern 111 that cover the plurality of elements (excluding the openings) of the transparent conductive film pattern 31 may be provided.

The light-transmissive regions 40 and the electrophoretic element 60 are interposed between the surface 21a (main surface) of the first transparent substrate 21, the insulating film pattern 111, the surface 22a (main surface) of the second transparent substrate 22, and the insulating film pattern 112. Examples of a material to form the insulating film pattern 111 and the insulating film pattern 112 include silicon oxide, silicon nitride, or the like.

In the light beam direction control element 11 of FIG. 19, the conductive light-shielding film pattern 30 is formed instead of the transparent conductive film pattern 31 in FIG. 18. Details of the conductive light-shielding film pattern 30 are as described in Embodiment 2.

Figure 20A:
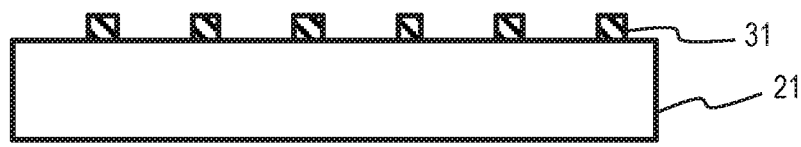
FIG. 20A is an explanatory diagram illustrating an example of a step (a transparent conductive film pattern formation step) of a manufacturing method for the light beam direction control element according to Embodiment 6.
Figure 20B:
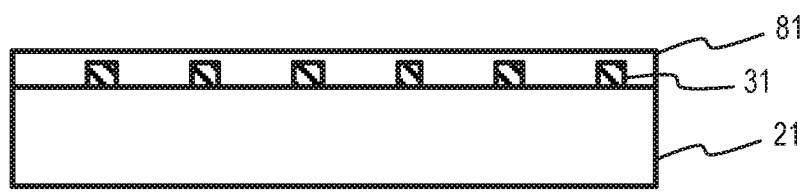
FIG. 20B is an explanatory diagram illustrating an example of a step (an insulating film layering step) of the manufacturing method for the light beam direction control element according to Embodiment 6.
Figure 20C:
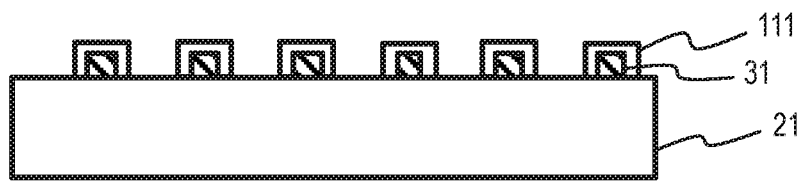
FIG. 20C is an explanatory diagram illustrating an example of a step (an insulating film partial removal step) of the manufacturing method for the light beam direction control element according to Embodiment 6.

An example of a manufacturing method for the light beam direction control element of FIG. 18 will be described with reference to FIGS. 20A to 20H. The transparent conductive film pattern formation step of FIG. 20A and the insulating film formation step of FIG. 20B are similar to the transparent conductive film pattern formation step of FIG. 12A and the insulating film formation step of FIG. 12B, and thus, descriptions thereof are omitted. Next, in FIG. 20C, portions of the insulating film 81 other than those that cover the respective elements of the transparent conductive film pattern 31 are removed, thereby forming the insulating film pattern 111 (insulating film partial removal step).

Figure 20D:
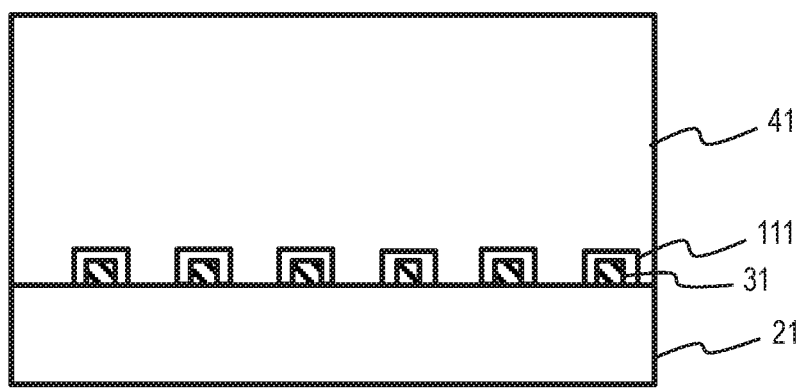
FIG. 20D is an explanatory diagram illustrating an example of a step (a photosensitive resin layering step) of the manufacturing method for the light beam direction control element according to Embodiment 6.

Next, as illustrated in FIG. 20D, in a manner similar to FIG. 7B, a transparent photosensitive resin layer 41 is layered as a negative photoresist film on the main surface side of the first transparent substrate 21 on which the transparent conductive film pattern 31 and the insulating film pattern 111 are formed (photosensitive resin layering step).

Figure 20E:
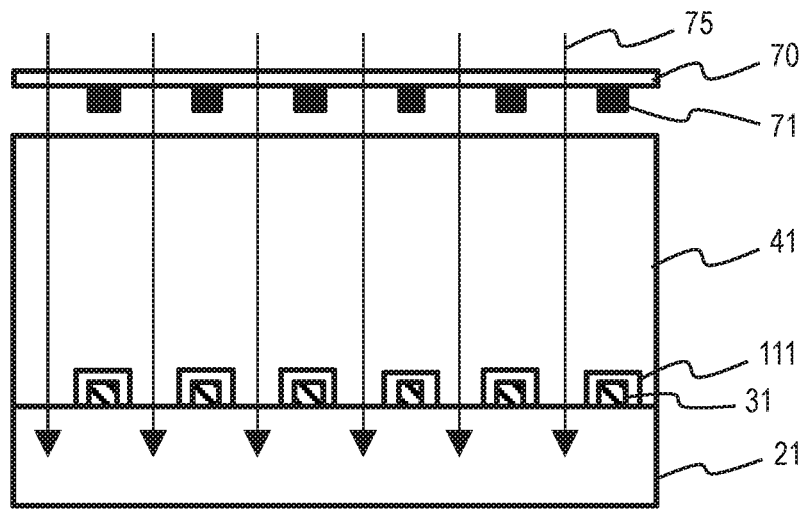
FIG. 20E is an explanatory diagram illustrating an example of steps (an exposure light radiation step and a position control step) of the manufacturing method for the light beam direction control element according to Embodiment 6.

Next, as illustrated in FIG. 20E, in a manner similar to FIG. 7C, exposure light 75 is radiated onto the transparent photosensitive resin layer 41 through a photomask 70 including a mask pattern 71, thereby exposing the transparent photosensitive resin layer 41 (exposure light radiation step). When performing the exposure light radiation step, the positions of the photomask 70 and the first transparent substrate 21 are adjusted such that the position of the mask pattern 71 overlaps the transparent conductive film pattern 31 (position control step).

Figure 20F:
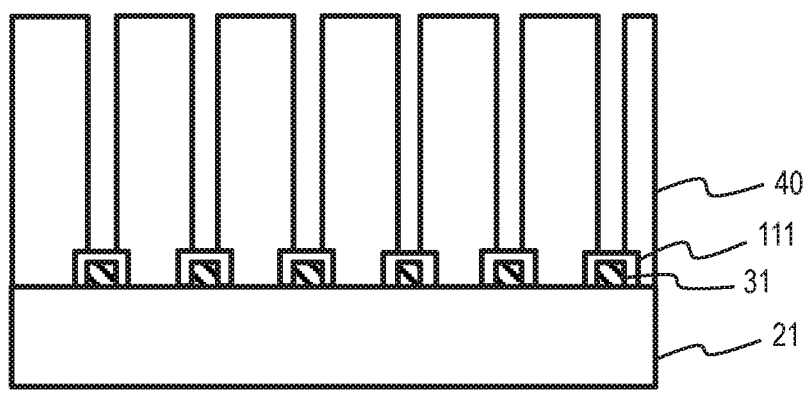
FIG. 20F is an explanatory diagram illustrating an example of a step (a transmissive region formation step) of the manufacturing method for the light beam direction control element according to Embodiment 6.

Next, as illustrated in FIG. 20F, in a manner similar to FIG. 7D, by performing a developing process on the exposed transparent photosensitive resin layer 41, the plurality of light-transmissive regions 40 that are separated from each other as illustrated in FIG. 20F are formed (transmissive region formation step).

Figure 20G:
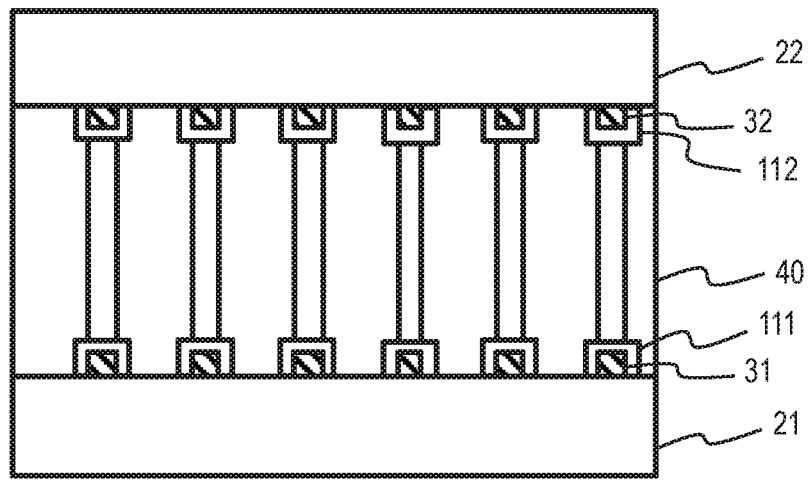
FIG. 20G is an explanatory diagram illustrating an example of a step (a transparent substrate placement step) of the manufacturing method for the light beam direction control element according to Embodiment 6.
Figure 20H:
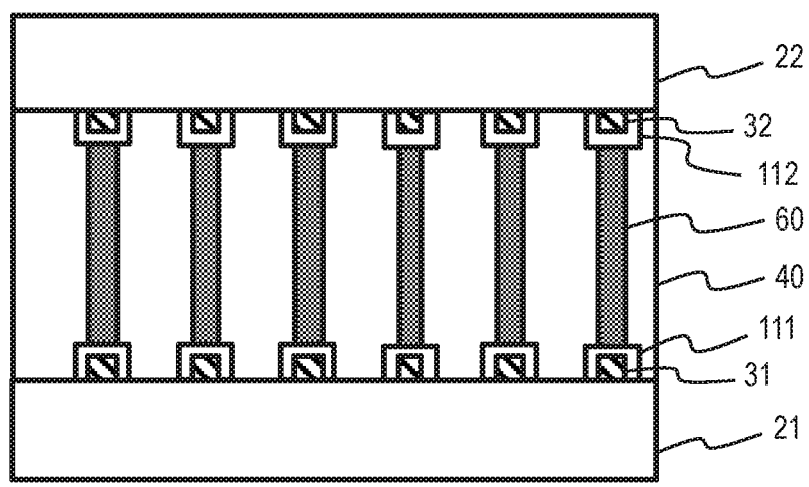
FIG. 20H is an explanatory diagram illustrating an example of a step (an electrophoretic element filling step) of the manufacturing method for the light beam direction control element according to Embodiment 6.

Next, as illustrated in FIG. 20G, the second transparent substrate 22 including the transparent conductive film pattern 32 and the insulating film pattern 112 is disposed on the surfaces of the light-transmissive regions 40 (transparent substrate placement step). Then, as illustrated in FIG. 20H, the gaps formed between the first transparent substrate 21, the insulating film pattern 111, the second transparent substrate 22, the insulating film pattern 112, the transparent conductive film pattern 31, the light-transmissive regions 40, and the transparent conductive film pattern 32 are filled with the electrophoretic element 60 electrophoretic element filling step).

The manufacturing method for the light beam direction control element 11 of FIG. 19 is similar to the manufacturing method for the light beam direction control element 11 of FIG. 18, but the illumination formation step (rear surface exposure) described with reference to FIG. 8 in Embodiment 2 may be employed instead of the exposure light radiation step and the transmissive region formation step.

In the light beam direction control element 11 of the present embodiment, as a result of patterning the insulating films disposed on the surfaces of the transparent conductive films (or conductive light-shielding film pattern), which are electrodes, a light beam direction control element 11 with an even higher transmittance can be achieved.

Details of the embodiments were described above with reference to the drawings, but the specific configuration of the present disclosure is not limited thereto, and various modifications and equivalent configurations are included within the spirit of the included claims.

What is claimed is:

1. A display device comprising:
   a light beam direction control element; and
   a display unit,
   wherein the light beam direction control element comprises:
   a first transparent substrate;
   a second transparent substrate disposed so as to face the first transparent substrate;
   a first conductive film pattern that has openings and that is formed on a first surface of the first transparent substrate opposing the second transparent substrate;
   a second conductive film pattern that has openings and that is formed on a second surface of the second transparent substrate opposing the first transparent substrate;
   an electrophoretic element that is sandwiched between the first conductive film pattern and the second conductive film pattern, and that includes light-shielding electrophoretic particles that have a surface charge and a transparent dispersion medium; and
   a plurality of light-transmissive regions that are disposed between the first transparent substrate and the second transparent substrate, that are sandwiched between at least a portion of the openings of the first conductive film pattern and at least a portion of the openings of the second conductive film pattern, that have a surface parallel to the first conductive film pattern and the second conductive film pattern, and that have side walls surrounded by the electrophoretic element,
   wherein the display unit comprises a display surface that displays an image,
   wherein the first conductive film pattern is a conductive light-shielding film pattern and the second conductive film pattern is a transparent conductive film pattern,
   wherein a surface of the second transparent substrate opposite the second surface is bonded to the display unit,
   wherein the first conductive film pattern and the second conductive pattern are stripe shapes arranged in a complementary positions to the plurality of the light-transmissive regions, and
   wherein a pattern width of the first conductive film pattern and a pattern width of the second conductive film pattern are greater than a width of the electrophoretic element.

2. The display device according to claim 1, wherein a pattern width of one of the first conductive film pattern and the second conductive film pattern is greater than a pattern width of another of the first conductive film pattern and the second conductive film pattern.

* * * * *